United States Patent Office 3,044,981
Patented July 17, 1962

3,044,981
PROCESS FOR STABILIZING POLYOLEFINES
Hugo Malz, Leverkusen, Friedrich Lober and Otto Bayer, Leverkusen-Bayerwerk, and Hans Scheurlen, Leverkusen, Germany, assignors to Farbenfabriken Bayer Aktiengesellschaft, Leverkusen, Germany, a corporation of Germany
No Drawing. Filed Dec. 29, 1959, Ser. No. 862,460
Claims priority, application Germany Jan. 9, 1959
10 Claims. (Cl. 260—45.9)

This invention relates to the stabilization of polyolefines. Polymeric olefines, such as for example polyethylene, polypropylene or polybutylene, experience uncontrollable changes under the action of atmospheric oxygen and ozone, and these changes become apparent as undesirable discolourations and as a deterioration in the mechanical properties of plastics manufactured therefrom. The influence of heat and light considerably promotes such degradation and embrittlement processes, so that polyolefines seem unsuitable for many purposes of use.

An attempt has already been made to prevent such aging phenomena in polyolefines by adding anti-oxidizing agents and stabilizers. In addition to such agents which are known as antioxidants in connection with natural and synthetic rubber (for example alkyl phenols, p-phenylene diamine and naphthylamine derivatives), there have inter alia also been proposed for these purposes sulphur-containing compounds, such as thiuram disulphides, phenol sulphides and mercaptans. The action of such compounds is however, often only limited and usually only slight, especially when the polyolefines are under continuous stress. In addition, when the said compounds are used, there frequently occurs a discolouration of the polymers and a considerable nuisance due to odours during the manufacture and processing of the mixtures.

It has now been found that polyolefines can be protected in an excellent manner against the harmful influence of atmospheric oxygen and ozone, even with the simultaneous effect of heat and light, if thiol- or thionothiol-phosphoric acid ester-S-amides or -S-sulphenamides are added to the said polyolefines.

The compounds employed according to the invention can be characterized by the general formula $$\begin{array}{c} R_1-O \\ \phantom{R_1-O}\diagdown \\ \phantom{R_1-O}\phantom{\diagdown}P-S_n-N \\ \phantom{R_1-O}\diagup\phantom{P-S_n-}\diagdown \\ R_2-O \phantom{\diagup P}\overset{\displaystyle\parallel}{S(O)}\phantom{-S_n-N}R_4 \end{array} \begin{array}{c} R_3 \\ \\ R_4 \end{array}$$

In this formula, $R_1$ and $R_2$ stand for hydrocarbon radicals which may be substituted, $R_3$ for hydrocarbon radicals which may be substituted, a nitrile group or the groups $$-\overset{\displaystyle O}{\underset{\displaystyle \parallel}{C}}-X$$

or $$-SO_2Y$$

in which X can stand for hydrogen or a hydrocarbon radical which may be substituted, alkoxy, aralkoxy or aroxy radicals and Y for a hydrocarbon radical which may be substituted. $R_4$ stands for hydrogen, a hydrocarbon radical which may be substituted or, in those cases in which $R_3$ is not a nitrile group, for the groups $$-\overset{\displaystyle O}{\underset{\displaystyle \parallel}{C}}-X$$

or $-SO_2-Y$, in which X and Y have the meaning previously indicated. Moreover, the radicals $R_3$ and $R_4$, together with the amide nitrogen, can be members of a ring system which can for example be a 5- or 6-membered ring, and which can contain—besides the amide nitrogen—other hetero atoms, such as for example nitrogen, oxygen or sulphur, and which if desired can also be substituted. $n$ is 1 or 2.

The compounds used according to the invention can for example be obtained by the processes described in U.S. patent specification No. 2,891,059 by reacting amine sulphene halides or N-halogen amine or amide compounds with the alkali salts of thiol or thionothiol phosphoric acid esters.

As substituents, the hydrocarbon radicals, which are advantageously those with up to 12 carbon atoms, can for example contain halogens, more especially chlorine or bromine, or amino or nitro groups.

The following Table 1 sets out a number of the stabilizers used according to the invention, without however the scope of the class of compounds claimed being restricted in any way:

TABLE 1

(1) $(C_2H_5O)_2\underset{\underset{\displaystyle S}{\displaystyle \parallel}}{P}-S-S-N(CH_3)_2$  B.p.$_{0.08}$: 118°

Thiol-thionophosphoric acid-O,O-diethylester-S-dimethyl sulphenamide (2) $(C_2H_5O)_2\underset{\underset{\displaystyle S}{\displaystyle \parallel}}{P}-S-S-N(C_2H_5)_2$  undistillable oil Thiol-thionophosphoric acid-O,O-diethyl ester-S-diethyl sulphenamide (3) $(C_2H_5O)_2\underset{\underset{\displaystyle S}{\displaystyle \parallel}}{P}-S-S-N$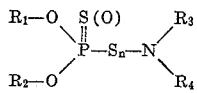  undistillable oil Thiol-thionophosphoric acid-O,O-diethyl ester-S-sulphene piperidide (4) 
$(C_2H_5O)_2\underset{\underset{\displaystyle S}{\displaystyle \parallel}}{P}-S-S-N\overset{\displaystyle C_2H_5}{\diagdown}$  undistillable oil Thiol-thionophosphoric acid-O,O-diethyl ester-S-cyclohexyl-(N-ethyl)-sulphenamide (5) $(C_2H_5O)_2\underset{\underset{\displaystyle S}{\displaystyle \parallel}}{P}-S-N-\left(\text{}\right)_2$  M.P. 71° C.

Thiol-thionophosphoric acid-O,O-diethyl ester-S-dicyclohexyl-sulphenamide (6) $(C_2H_5O)_2\underset{\underset{\displaystyle S}{\displaystyle \parallel}}{P}-S-\underset{\underset{\displaystyle H}{\displaystyle |}}{N}-$  oil Thiol-thionophosphoric acid-O,O-diethyl ester-S-cyclohexyl-amide (7) $(i-C_4H_9O)_2\underset{\underset{\displaystyle S}{\displaystyle \parallel}}{P}-S-N\left(\text{H}\right)_2$  oil Thiol-thionophosphoric acid-O,O-diisobutyl ester-S-dicyclohexylamide (8) $(CH_3O)_2\underset{\underset{\displaystyle O}{\displaystyle \parallel}}{P}-S-\underset{\underset{\displaystyle CH_3}{\displaystyle |}}{N}-\underset{\underset{\displaystyle O}{\displaystyle \parallel}}{C}-OC_2H_5$  B.P.$_{0.1}$: 137 to 140° C.

Thiol-phosphoric acid-O,O-dimethyl ester-S-(N-methyl)-carbonic acid ethyl ester amide (9) $(CH_3O)_2\underset{\underset{\displaystyle O}{\displaystyle \parallel}}{P}-S-N\begin{array}{c}\overset{\displaystyle O}{\underset{\displaystyle \parallel}{C}}-CH_2 \\ | \\ \underset{\underset{\displaystyle O}{\displaystyle \parallel}}{C}-CH_2\end{array}$  M.P. 93° C.

Thiol-phosphoric acid-O,O-dimethyl ester-S-succinimide

(10) $(CH_3O)_2\underset{\underset{\displaystyle O}{\displaystyle \parallel}}{P}-S-N\overset{\displaystyle C\equiv N}{\diagdown C_8H_{17}-\text{tert.}}$  oil Thiol-phosphoric acid-O,O-dimethyl ester-S-(N-tert.octyl)-cyanamide

(11) $(C_2H_5O)_2\underset{\underset{\displaystyle S}{\displaystyle \parallel}}{P}-S-\underset{\underset{\displaystyle H}{\displaystyle |}}{N}-\underset{\underset{\displaystyle O}{\displaystyle \parallel}}{C}-OC_2H_5$  M.P. 73° C.

Thiol-thionophosphoric acid-O,O-diethyl ester-S-carbonic acid ethyl ester amide

(12) (C₂H₅O)₂P(=S)—S—N(CH₃)—C(=O)—OCH₃   M.P. 5 to 8° C.

Thiol-thionophosphoric acid-O,O-diethylester-S-(N-methyl)-carbonic acid methyl ester amide

(13) (C₂H₅O)₂P(=S)—S—N(—C(=O)—CH₂—)(—C(=O)—CH₂—)   M.P. 96° C.

Thiol-thionophosphoric acid-O,O-diethylester-S-succinimide

(14) (C₆H₅—O—)₂P(=S)—S—N(C₂H₅)—C(=O)—OC₂H₅   oil

Thiol-thionophosphoric acid-O,O-diphenyl ester-S-(N-ethyl)-carbonic acid ethyl ester amide

(15) (C₂H₅O)₂P(=S)—S—N(CH₃)—SO₂—C₆H₅   M.P. 65° C.

Thiol-thionophosphoric acid-O,O-diethyl ester-S-(N-methyl)-benzene sulphonic acid amide

(16) (C₆H₅—O—)₂P(=S)—S—N(CH₃)—SO₂—C₆H₅   M.P. 94° C.

Thiol-thionophosphoric acid-O,O-diphenyl ester-S-(N-methyl)-benzene sulphonic acid amide

(17) (C₂H₅O)₂P(=S)—S—N(C₆H₅)—C(=O)—CH₃   M.P. 62° C.

Thiol-thionophosphoric acid-O,O-diethyl ester-S-acetanilide

(18) (C₂H₅O)₂P(=S)—S—N(C₆H₅)—CHO   M.P. 54° C.

Thiol-thionophosphoric acid-O,O-diethyl-S-formanilide

(19) (n—C₃H₇O)₂P(=S)—S—N(C≡N)(C₈H₁₇—tert.)   oil

Thiol-thionophosphoric acid-O,O-di-norm.propylester-S-(N-tert.octyl)-cyanamide

(20) (C₂H₅O)₂P(=S)—S—N(phthalimide)   M.P. 123° C.

Thiol-thionophosphoric acid-O,O-diethylester-S-phthalimide

The compounds to be used according to the invention can be added to the polyolefines in quantities of 0.01 to 10% by weight advantageously 0.02 to 5% by weight, based on the polyolefines. In many cases, it may be desirable to use mixtures of the compounds claimed with one another or with other stabilizers. The compounds claimed develop their stabilizing action in the pure polymers and also in mixtures thereof with carbon black, aluminium powder, fillers and dyestuffs.

The stabilizers can be incorporated in the usual manner, for example by treating the polyolefines in powder form with the stabilizers in a kneader, in a ball mill or on a roller. A particularly uniform distribution of the stabilizers in the polyolefines is produced if the mixture is conveyed at a temperature above the melting point of the polyolefines through a heatable extrusion press. The polyolefine powder can also be treated with solutions of the stabilizers in a suitable solvent which can easily be removed again.

Examples of the polyolefines are polyethylene, polypropylene and polybutylene.

The following examples serve for further explaining the process of the invention. The parts and percentages given are by weight if not otherwise stated.

*Example 1*

A polyethylene prepared by the low-pressure process and having an average molecular weight of about 90,000 was mixed on a roller mill heated to 160° C. with 0.5% of one of the compounds as set out in the following Table 2. The sheet obtained in this way was granulated and moulded in an injection moulding machine to form standard small rods having the dimensions 50×6×4 mm. The notch impact strength of these test elements was measured in accordance with DIN 53453 at different times during a storage period lasting up to 32 days at 70° C. and an oxygen pressure of 21 atm. gauge.

The following Table shows the notch impact strength of the polyethylene samples stabilized with the compounds according to the invention. The values correspond to the average of 10 separate measurements in each case. For comparison purposes, a sample of polyethylene without stabilizer is also indicated and furthermore results with the compounds numbered 9 and 10 which are the best known stabilizers.

TABLE 2

| Additive | Notch impact strength (cm. kg./cm.²) | | |
|---|---|---|---|
| | Prior to ageing | After 4 days | After 32 days |
| 1. Without | 37.5 | 1.3 | ----- |
| 2. (C₂H₅O)₂P(=S)—S—N(CH₃)₂ | 36.2 | 39.5 | 34.4 |
| 3. (C₂H₅O)₂P(=S)—S—N(C₂H₅)(C₆H₁₁) | 35.0 | 34.8 | 30.1 |
| 4. (C₂H₅O)₂P(=S)—S—N(H)(C₆H₁₁) | 37.4 | 40.4 | 33.2 |
| 5. (i—C₄H₉O)₂P(=S)—S—N(i—C₃H₇)₂ | 32.8 | 38.8 | 34.6 |
| 6. (C₂H₅O)₂P(=S)—S—N—C(=O)—C₆H₅ | 37.1 | 36.8 | 36.1 |
| 7. (C₂H₅O)₂P(=S)—S—N(—CO—CH₂—)(—CO—CH₂—) | 33.9 | 35.9 | 36.1 |
| 8. (C₂H₅O)₂P(=S)—S—N(CH₃)—SO₂—C₆H₄—NO₂ | 33.3 | 35.5 | 31.7 |
| 9. P(O—C₆H₄—C₉H₁₉)₃ | 31.8 | 33.9 | 3.9 |
| 10. OH—C₆H₂(tert.C₄H₉)₂—CH₃ | 35.7 | 35.7 | 1.8 |

Instead of the polyethylene there can be used also polypropylene, e.g. an isotactic polypropylene obtained from propylene with Ziegler catalysts having an atactic content of about 5% and a density of about 0.91 g./cm.³. These polypropylenes show similar improvements of the notched impact strength values as the polyethylene.

We claim:
1. In the process for stabilizing a member selected from the group consisting of polyethylene, polypropylene and polybutylene the improvement which comprises using as stabilizer 0.01–10% by weight, based on the weight of said monoolefinic polymer of compounds of the general formula:

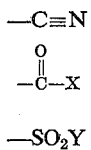

in which $R_1$, $R_2$ and $R_3$ represent a member selected from the group consisting of substituted and unsubstituted hydrocarbon radicals, and wherein $R_3$ represents furthermore the groups $$-C\equiv N$$
$$-\overset{O}{\underset{\|}{C}}-X$$

and
$$-SO_2Y$$

in which X stands for a member selected from the group consisting of hydrogen, substituted and unsubstituted hydrocarbon radicals, alkoxy radicals, aralkoxy radicals, and aroxy radicals and Y stands for substituted and unsubstituted hydrocarbon radicals, $R_4$ represents a member selected from the group consisting of hydrogen, substituted and unsubstituted hydrocarbon radicals and in those cases in which $R_3$ does not stand for the nitrile group, represents $R_4$ the groups $$-\overset{O}{\underset{\|}{C}}-X$$

and $-SO_2Y$, in which X and Y have the meaning indicated above, $R_3$ and $R_4$ represent furthermore if they are directly connected together with the amide nitrogen members of a ring system and $n$ represents 1 and 2; the aforesaid substituted and unsubstituted hydrocarbon radicals containing up to 12 carbon atoms, the substituents on the substituted hydrocarbon radicals being selected from the group consisting of halogen, amino, and nitro groups.

2. Process as claimed in claim 1 wherein a compound of the formula

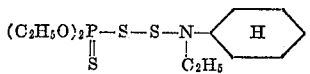

is used as stabilizer.

3. Process as claimed in claim 1 wherein a compound of the formula

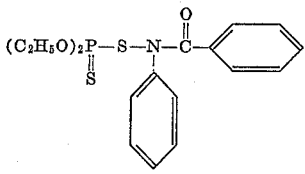

is used as stabilizer.

4. Process as claimed in claim 1 wherein a compound of the formula

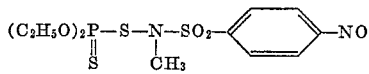

is used as stabilizer.

5. Process as claimed in claim 1 wherein a compound of the formula

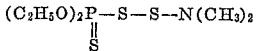

is used as stabilizer.

6. Polyethylene stabilized with 0.01–10% by weight of the stabilizer of claim 2.

7. Polyethylene stabilized with 0.01–10% by weight of the stabilizer of claim 3.

8. Polyethylene stabilized with 0.01–10% by weight of the stabilizer of claim 4.

9. Polyethylene stabilized with 0.01–10% by weight of the stabilizer of claim 5.

10. A polyolefin selected from the group consisting of polyethylene, polypropylene and polybutylene which is stabilized with 0.01–10% of the stabilizer of claim 1.

References Cited in the file of this patent

UNITED STATES PATENTS 2,891,059    Malz et al. _____ June 16, 1959